United States Patent
Benisty

(10) Patent No.: US 12,045,516 B2
(45) Date of Patent: Jul. 23, 2024

(54) DRAM-LESS SSD WITH SECURE HMB FOR LOW LATENCY

(71) Applicant: Western Digital Technologies, Inc., San Jose, CA (US)

(72) Inventor: Shay Benisty, Beer Sheva (IL)

(73) Assignee: Sandisk Technologies, Inc., Austin, TX (US)

( * ) Notice: Subject to any disclaimer, the term of this patent is extended or adjusted under 35 U.S.C. 154(b) by 302 days.

(21) Appl. No.: 17/652,652

(22) Filed: Feb. 25, 2022

(65) Prior Publication Data

US 2022/0179593 A1 Jun. 9, 2022

Related U.S. Application Data

(63) Continuation-in-part of application No. 17/183,140, filed on Feb. 23, 2021.

(60) Provisional application No. 63/086,966, filed on Oct. 2, 2020.

(51) Int. Cl.
G06F 21/00 (2013.01)
G06F 3/06 (2006.01)

(52) U.S. Cl.
CPC .......... *G06F 3/0679* (2013.01); *G06F 3/0604* (2013.01); *G06F 3/0656* (2013.01); *G06F 3/0659* (2013.01)

(58) Field of Classification Search
CPC .... G06F 3/0679; G06F 3/0604; G06F 3/0656; G06F 3/0659; G06F 21/79; G06F 3/062; G06F 3/061
See application file for complete search history.

(56) References Cited

U.S. PATENT DOCUMENTS

| | | |
|---|---|---|
| 10,157,004 B2 | 12/2018 | Michaeli |
| 10,268,584 B2 | 4/2019 | Hahn |
| 2017/0060668 A1* | 3/2017 | Farhan ............... G06F 12/0871 |
| 2018/0081799 A1 | 3/2018 | Kanno |
| 2018/0260151 A1 | 9/2018 | Hsu |
| 2019/0004949 A1* | 1/2019 | Kim .................... G06F 12/0246 |
| 2020/0004679 A1 | 1/2020 | Szubbocsev et al. |
| 2020/0097194 A1 | 3/2020 | Grosz |
| 2020/0098423 A1* | 3/2020 | Huang .................. G11C 11/419 |
| 2020/0110677 A1 | 4/2020 | Kim et al. |

(Continued)

FOREIGN PATENT DOCUMENTS

KR 20200056538 A 5/2020

*Primary Examiner* — Ghazal B Shehni
(74) *Attorney, Agent, or Firm* — PATTERSON + SHERIDAN, LLP

(57) ABSTRACT

Aspects of the present disclosure generally relate to data storage devices and related methods that use secure host memory buffers and low latency operations. In one aspect, a controller is configured to fetch a command from a host device, and fetch entry data from a host memory buffer (HMB) of the host device in response to the command from the host device. The HMB is utilized in place of DRAM in the controller so that the data storage device is DRAM-less. In one embodiment, the entry data includes a logical to physical (L2P) address. The controller is also configured to fetch read data from the one or more memory devices using the entry data, conduct a validity check of the entry data fetched from the HMB simultaneously with the fetching of the read data from the one or more memory devices, and transmit validity result data to the host device.

20 Claims, 6 Drawing Sheets

(56) References Cited

U.S. PATENT DOCUMENTS

| | | |
|---|---|---|
| 2020/0133566 A1 | 4/2020 | Kim et al. |
| 2020/0151040 A1* | 5/2020 | Lee .................... G06F 3/0673 |
| 2020/0151109 A1* | 5/2020 | Cho .................... G06F 12/0238 |
| 2020/0201964 A1 | 6/2020 | Nandakumar et al. |
| 2021/0248076 A1* | 8/2021 | Musin .................. G06F 9/30029 |

* cited by examiner

DRAM-LESS SSD WITH SECURE HMB FOR LOW LATENCY

CROSS-REFERENCE TO RELATED APPLICATIONS

This application is a continuation-in-part of co-pending U.S. patent application Ser. No. 17/183,140, filed Feb. 23, 2021, which claims benefit of U.S. provisional patent application Ser. No. 63/086,966, filed Oct. 2, 2020. Each of the aforementioned related patent applications is herein incorporated by reference.

BACKGROUND OF THE DISCLOSURE

Field of the Disclosure

Aspects of the present disclosure generally relate to data storage devices and related methods that use secure host memory buffers (HMBs) and low latency operations. In one aspect, a data storage device uses simultaneous memory sensing operations and validity checking operations to facilitate low latency.

Description of the Related Art

Host memory buffers (HMBs) of host devices are used in conjunction with data storage devices, such as solid-state drives (SSDs). HMB is a dedicated storage location within a host device. The host device provides the HMB for the data storage device to use as desired. The host device does not control what the data storage device does with the HMB. The host device only controls access to the HMB. Thus, the host device may, at times, prevent access to the HMB. The HMB may be used as additional storage for the data storage device beyond the DRAM that is located within the controller.

The HMB can be subjected to security attacks, such as network attacks including replay attacks and/or playback attacks. Such attacks can expose host devices and hinder performance. However, efforts to secure HMBs of host devices against such attacks can result in latency delays, such as latency delays of 4 µSec (microseconds) or more.

Therefore, there is a need in the art for data storage devices that practically and simply secure HMBs while facilitating reduced latency and heightened performance.

SUMMARY OF THE DISCLOSURE

Aspects of the present disclosure generally relate to data storage devices and related methods that use secure host memory buffers and low latency operations. In one aspect, a controller of a data storage device that is coupled to one or more memory devices is configured to fetch a command from a host device, and fetch entry data from a host memory buffer (HMB) of the host device in response to the command from the host device. The HMB is utilized in place of DRAM in the controller so that the data storage device is DRAM-less. In one embodiment, the entry data includes a logical to physical (L2P) address. The controller is also configured to fetch read data from the one or more memory devices using the entry data, conduct a validity check of the entry data fetched from the HMB simultaneously with the fetching of the read data from the one or more memory devices, and transmit validity result data to the host device.

In one embodiment, a data storage device comprises one or more memory devices, and a controller coupled to the one or more memory devices, wherein the controller is DRAM-less. The controller is configured to fetch a command from a host device, and the host device includes a host memory buffer (HMB). The controller is configured to fetch entry data from the HMB in response to the command from the host device. The controller is configured to fetch read data from the one or more memory devices using the entry data. The controller is configured to conduct a validity check of the entry data fetched from the HMB simultaneously with the fetching of the read data from the one or more memory devices, and transmit validity result data to the host device.

In one embodiment, a data storage device comprises one or more memory devices, and a controller coupled to the one or more memory devices, wherein the controller is DRAM-less. The controller is configured to fetch a command from a host device. The host device includes a host memory buffer (HMB), and the HMB includes a Merkle tree having a plurality of hashes. The controller is configured to fetch entry data from the HMB in response to the command from the host device. The controller is configured to fetch read data from the one or more memory devices using the entry data. The controller is configured to conduct a validity check of the entry data fetched from the HMB simultaneously with the fetching of the read data from the one or more memory devices. The validity check includes comparing a signature of a top level hash of the plurality of hashes to a stored signature that is stored within the controller, and determining if the signature is the same as or different from the stored signature.

In one embodiment, a data storage device comprises memory means and a controller, wherein the controller is DRAM-less, and wherein the controller is configured to fetch a command from a host device, and the host device includes a host memory buffer (HMB); fetch entry data from the HMB in response to the command from the host device; fetch read data from one or more memory devices using the entry data; conduct a validity check of the entry data fetched from the HMB simultaneously with the fetching of the read data from the one or more memory devices; and transmit validity result data to the host device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure generally relate to data storage devices and related methods that use secure host memory buffers and low latency operations. In one aspect, a controller of a data storage device that is coupled to one or more memory devices is configured to receive a command from a host device, and fetch entry data from a host memory buffer (HMB) of the host device in response to the command from the host device. The HMB is utilized in place of DRAM in the controller so that the data storage device is DRAM-less. In one embodiment, the entry data includes a logical to physical (L2P) address. The controller is also configured to fetch read data from the one or more memory devices using the entry data, conduct a validity check of the entry data fetched from the HMB simultaneously with the fetching of the read data from the one or more memory devices, and transmit validity result data to the host device.

Figure 1:
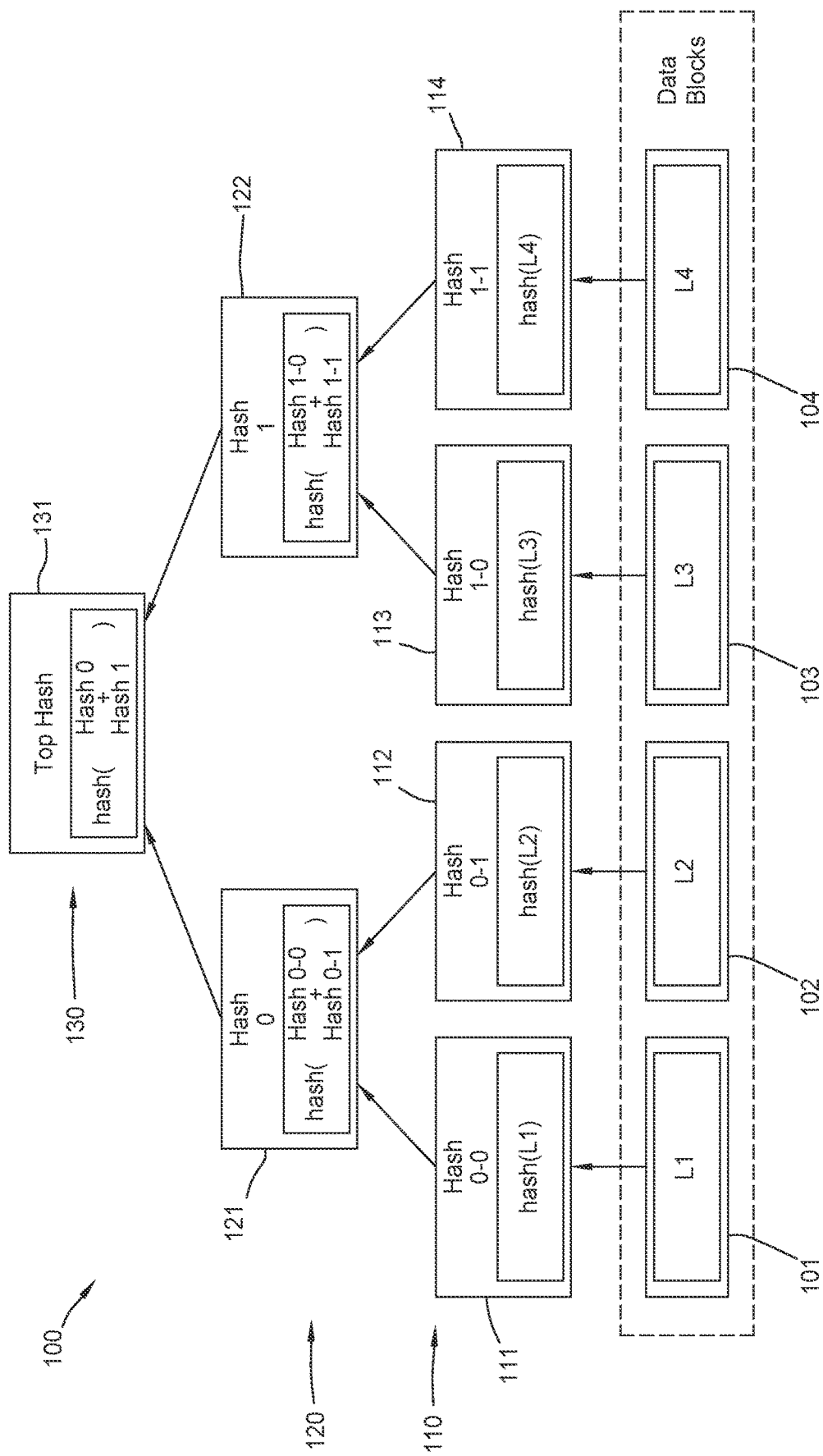
FIG. 1 is a schematic view of a Merkle tree, according to one implementation.

FIG. 1 is a schematic view of a Merkle tree 100, according to one implementation. The Merkle tree 100 includes data, such as entry data that corresponds to data stored in one or more memory devices. The data is stored in a plurality of data blocks 101-104. The Merkle tree 100 is part of a host device, such as an operating system of a host device. The Merkle tree 100 includes a first plurality of hashes 111-114 of a first hash level 110 and a second plurality of hashes 121,122 of a second hash level 120. The first plurality of hashes 111-114 are created using the plurality of data blocks 101-104. Each hash of the first plurality of hashes 111-114 corresponds to a data block of the plurality of data blocks 101-104. The second plurality of hashes 121, 122 are created by combining hashes of the first plurality of hashes 111-114. The Merkle tree 100 includes a top level hash 131 of a top hash level 130. The top hash level 130 includes a signature that is created using all of the hashes of the Merkle tree 100. The signature of the top level hash 131 is created by combining the two hashes 121, 122 of the hash level (e.g., the second hash level 120) that is disposed immediately below the top hash level 130. The top hash level 130 includes a single hash (e.g., the top level hash 131). As the Merkle tree 100 moves upward from the plurality of data blocks 101-104 and toward the top level hash 131, the hashes of each hash level 110, 120 are progressively combined until the signature of the single top level hash 131 is created for the top hash level 130.

The Merkle tree 100 is used to secure and validate (such as by using a validity check) a portion of a host device. Due to the progressive nature of the hash levels 110, 120, 130, the signature of the top level hash 131 is altered or corrupted if data of even one of the plurality of data blocks 101-104 is altered or corrupted, such as altered or corrupted during a network attack. The altered or corrupted signature of the top level hash 131 indicates that data of one or more of the data blocks 101-104 has been altered or corrupted. When data is written and stored in the data blocks 101-104, the Merkle tree 100 and the signature of the top level hash 131 are created. The signature of the top level hash 131 is stored as a stored signature.

The present disclosure contemplates that FIG. 1 is exemplary and can include more data blocks than the data blocks 101-104 illustrated in FIG. 1, more hash levels than the hash levels 110, 120, 130 illustrated in FIG. 1, and more hashes than the hashes 111-114, 121, 122, 131 shown in FIG. 1.

Figure 2A:
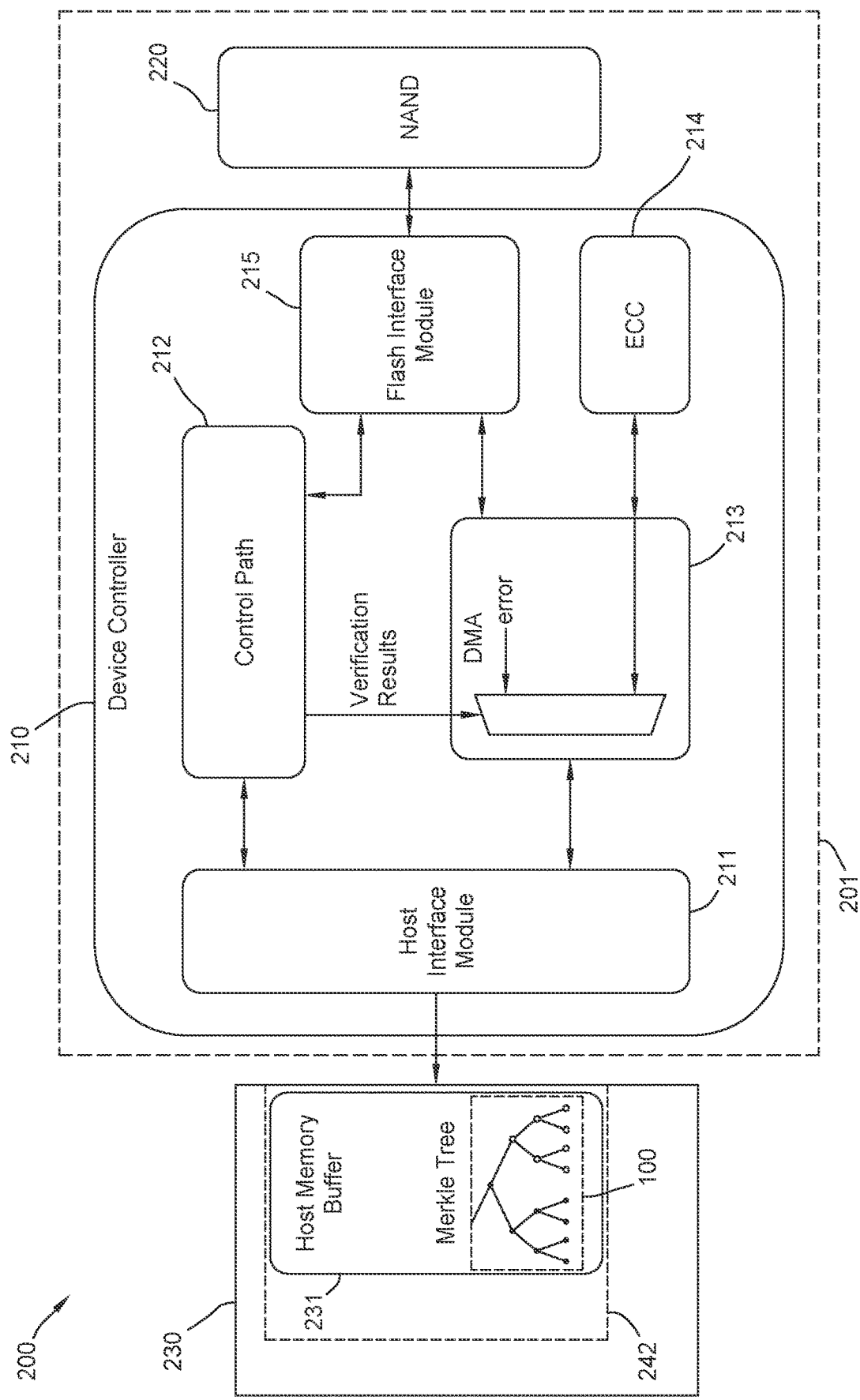
FIGS. 2A and 2B are schematic views of a data system, according to various implementations.

FIG. 2A is a schematic view of a data system 200, according to one implementation. The data system 200 includes a data storage device 201. In one embodiment, which can be combined with other embodiments, the data storage device 201 is a solid-state drive (SSD). The present disclosure contemplates that aspects of the data storage device 201 can be used in other data storage devices. The data storage device 201 includes a controller 210 coupled to one or more memory devices 220 (one is shown). In one embodiment, which can be combined with other embodiments, the one or more memory devices 220 are NAND devices. The present disclosure contemplates that aspects of the data storage device 201 can be used for other memory devices.

The disclosure contemplates that terms such as "couples," "coupling," "couple," and "coupled" may include but are not limited to operable coupling, such as wired or wireless coupling for communication purposes. The disclosure contemplates that terms such as "couples," "coupling," "couple," and "coupled" may include but are not limited to direct coupling and/or indirect coupling.

The controller 210 is coupled to a host memory buffer (HMB) 231 of a host device 230 of the data system 200. The HMB 231 includes the Merkle tree 100 shown in FIG. 1 stored in the HMB 231 of the host device 230. Each node of the Merkle tree 100 (shown in FIG. 1) is stored in the HMB 231 except for the top level hash 131 of the top hash level 130. The top level hash 131 and the associated stored signature is instead stored in the data storage device 201 and is not visible to the host device 230.

The host device 230 stores internal databases in the HMB 231, such as entry data that can include logical to physical (L2P) addresses. The HMB 231 is a part of a host memory 242 that is an external memory. As the HMB 231 is part of external memory, the Merkle tree 100 is used to secure the HMB 231 of the host device 230, such as by using a validity check to determine if the HMB 231 has been altered or corrupted by a network attack, such as a replay attack and/or a playback attack. When data is initially written and stored in the data blocks 101-104 using the host device 230, the Merkle tree 100 and the signature of the top level hash 131 are created, and the signature of the top level hash 131 is stored within the controller 210 as a stored signature. The present disclosure contemplates that the aspects disclosed herein may be used in conjunction with other security operations, such as security algorithms other than the Merkle tree 100.

The controller 210 includes a host interface module 211, a control path 212 having one or more processors, a direct memory access (DMA) 213, an error correction code (ECC) 214, and a flash interface module 215. The DMA 213, the control path 212, and the ECC 214 are a part of a flash translation layer (FTL) of the controller 210. The control path 212 is configured to control the one or more memory devices 220 and determine if the HMB 231 is secure. The control path 212 is also configured to control other aspects of the data storage device 201. The host interface module 211 is configured to communicate with the HMB 231 of the host device 230 and the control path 212. The host interface module 211 is configured to manage the HMB 231. The DMA 213 is configured to communicate with the host interface module 211 and the control path 212. The DMA 213 is configured to control transferring of data from the HMB 231 and to the controller 210, and from the controller 210 and to the host memory 242. The ECC 214 is configured to communicate with the DMA 213 and configured to encode and decode data for error correction in relation to the DMA 213. The flash interface module 215 is configured to communicate with the one or more memory devices 220. The controller 210 is configured to—in response to a command from the host device 230—fetch data from the one or more memory devices 220, simultaneously determine if the HMB 231 is secure, and forward the data from the one or more memory devices 220 on to the HMB 231 if the HMB 231 is secure. If the HMB 231 is insecure (such as altered or corrected), then forwarding of the data on to the HMB 231 is cancelled by the controller 210.

The flash interface module 215 is coupled to the one or more memory devices 220. The control path 212 is coupled to the one or more memory devices 220 through the flash interface module 215. Each of the control path 212, the flash interface module 215, and the ECC 214 is coupled to the DMA 213. The DMA 213 is coupled to the host interface module 211. The one or more memory devices 220 are coupled to the DMA 213 through the flash interface module 215. The host interface module 211 is coupled to the HMB 231 of the host device 230. The control path 212 is coupled to the host interface module 211, and the control path 212 is coupled to the HMB 231 through the host interface module 211.

The one or more memory devices 220 may include a plurality of memory devices or memory units. The one or more memory devices 220 may be configured to store and/or retrieve data. For instance, a memory unit of one or more memory devices 220 may receive data and a message from controller 210 that instructs the memory unit to store the data. Similarly, the memory unit may receive a message from controller 210 that instructs the memory unit to retrieve data. In some examples, each of the memory units may be referred to as a die. In some examples, the one or more memory devices 220 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The one or more memory devices 220 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 210 may write data to and read data from NVM flash memory devices at the page level and erase data from NVM flash memory devices at the block level.

Figure 2B:
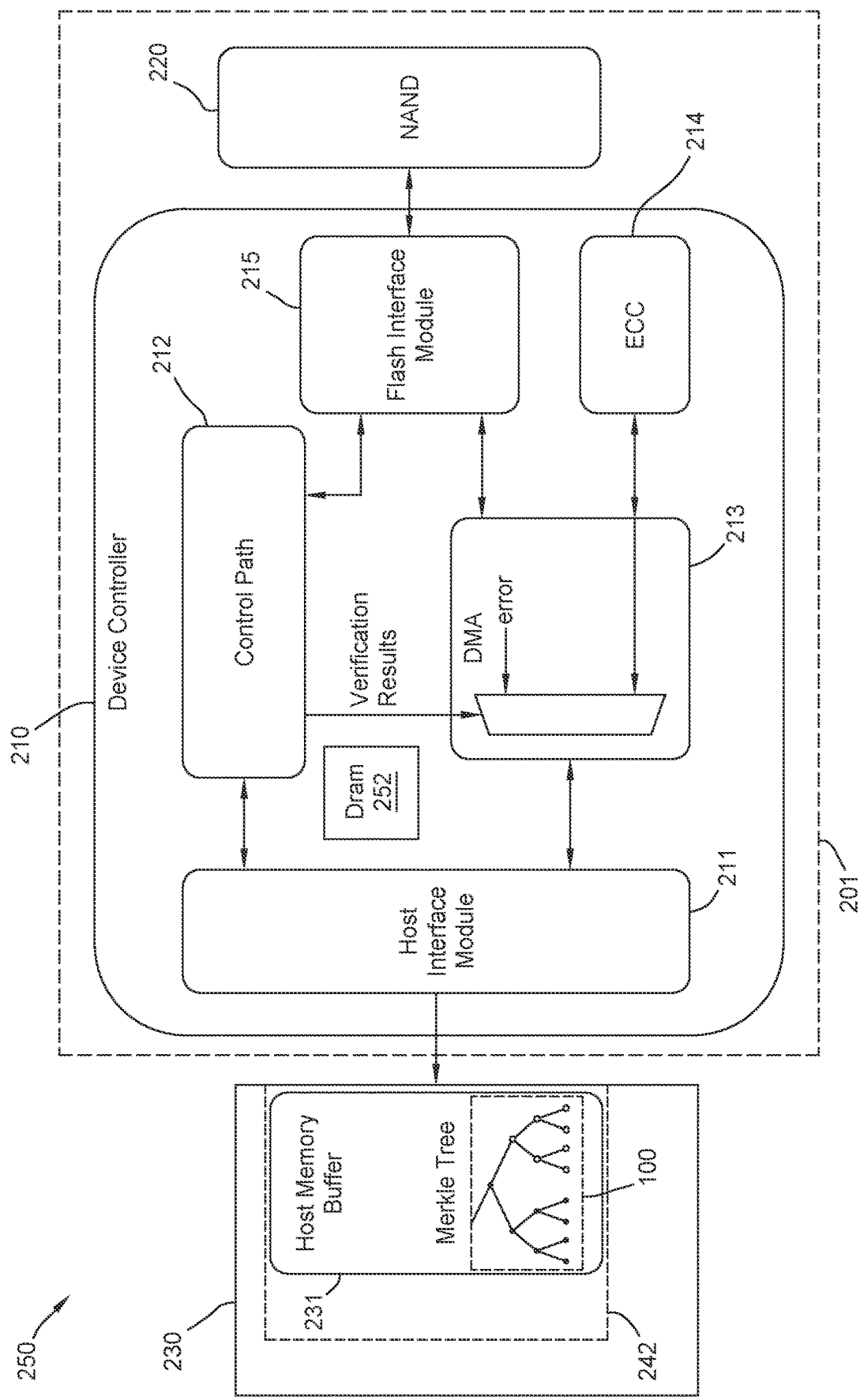

FIG. 2B is a schematic view of a data system 250, according to one implementation. The data system 250 is similar to the data system 200 shown in FIG. 2A, except the data system 250 includes DRAM 252 in the device controller 210 while data system 200 is DRAM-less. In a data system that includes DRAM 252, the data system 250 can choose to store data in either the DRAM 252, the HMB 231 or both. When data is stored in the HMB 231, the Merkle tree 100 is used to secure and validate the data stored in HMB 231.

Figure 3:
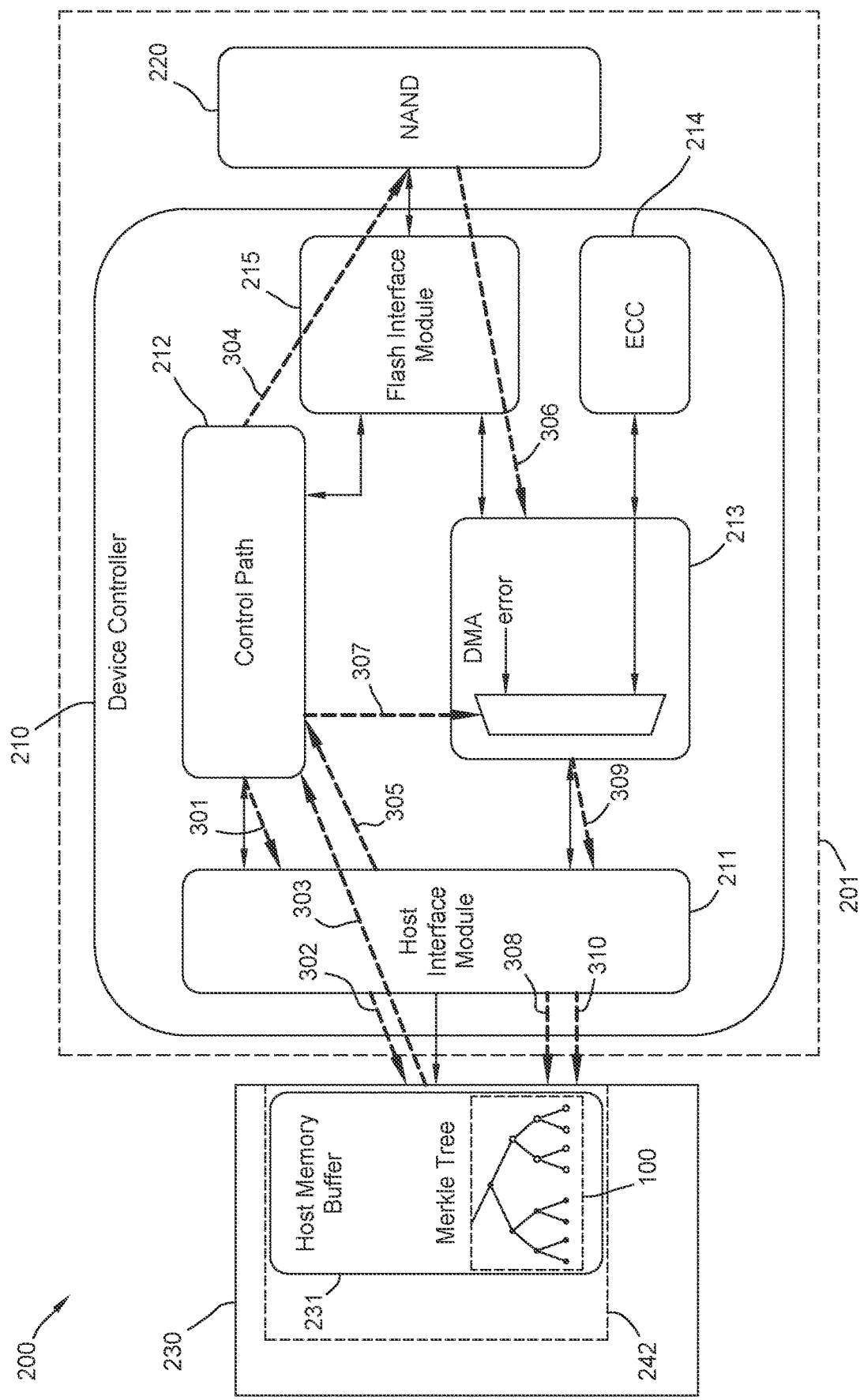
FIG. 3 is a schematic view of the data system shown in FIG. 2A during an operation flow using the data system.

FIG. 3 is a schematic view of the data system 200 shown in FIG. 2A during an operation flow using the data system 200. The operation flow occurs subsequently to the storing of the stored signature of the Merkle tree 100 in the host interface module 211. The controller 210 is configured to conduct the operations described herein in relation to the operation flow illustrated in FIG. 3.

In the operation flow, the control path 212 fetches a command from the host memory 242 of the host device 230. The command is a random read command from the host device 230. In response to the command from the host device 230, the controller 210 fetches entry data from the HMB 231 of the host device 230. In one embodiment, which can be combined with other embodiments, the entry data includes a logical to physical (L2P) address. The fetching of the entry data includes the control path 212 sending 301 a request to host interface module 211 to fetch the entry data from the HMB 231, and the host interface module 211 sending 302 a read request to the HMB 231. In response to the read request from the host interface module 211, the HMB 231 sends 303 the entry data to the control path 212 through the host interface module 211. In response to the entry data, the control path 212 speculatively uses the entry data and fetches read data from the one or more memory devices 220 using the entry data. In one embodiment, which can be combined with other embodiments, the read data fetched from the one or more memory devices 220 corresponds to the entry data, such as the L2P address.

The fetching of the read data from the one or more memory devices 220 includes the control path 212 sending 304 a sense request to the one or more memory devices 220 through the flash interface module 215. While the read data is being fetched from the one or more memory devices 220, the host interface module 211 conducts a validity check of the entry data fetched from the HMB 231 simultaneously with the fetching of the read data from the one or more memory devices 220. The entry data fetched from the HMB 231 includes a signature of a top level hash of a plurality of hashes of the Merkle tree 100 of the HMB 231. The validity check includes comparing the signature of the top level hash 131 of the plurality of hashes to the stored signature that is stored within the host interface module 211 of the controller 210. The validity check also includes determining if the signature is the same as or different from the stored signature. The validity check includes fetching data, such as hashes, from the HMB 231 and/or calculating hashes for the HMB 231. The validity check is executed by the host interface module 211. In one embodiment, which can be combined with other embodiments, the sense request is sent to the one or more memory devices 220 prior to the determining if the signature is the same as or different from the stored signature in the validity check. The host interface module 211 sends 305 results of the validity check to the control path 212. The control path 212 sends 307 the results received from the host interface module 211 to the DMA 213. The one or more memory devices 220 send 306 the read data to the DMA 213 through the flash interface module 215.

In response to the validity check and the results received by the DMA 213, the DMA 213 determines whether to send the read data to the host memory 242. If the results indicate that the signature analyzed in the validity check is the same as the stored signature, then the DMA 213 sends 309 instructions to the host interface module 211 to transmit 308 validity result data to the host memory 242 of the host device 230, and the validity result data transmitted to the host memory 242 from the host interface module 211 includes the read data that was fetched from the one or more memory devices 220. If the results indicate that the signature analyzed in the validity check is different from the stored signature, then the DMA 213 cancels sending of the read data to the host memory 242 and the DMA 213 sends 309 instructions to the host interface module 211 to transmit 308 validity result data to the host memory 242 of the host device 230. The validity result data transmitted to the host memory 242 from the host interface module 211 includes garbage data that is different from the read data. In one embodiment, which can be combined with other embodiments, the garbage data includes a random iteration of 0's and 1's that is different from the read data and different from the other data stored on the one or more memory devices 220.

The DMA 213 also sends instructions to the host interface module 211 to post 310 a completion message to the host memory 242 of the host device 230, and the host interface module 211 posts 310 the completion message to the host memory 242. If the DMA 213 determines that the signature is the same as the stored signature then the completion message includes a valid notification. The valid notification indicates to the host memory 242 of the host device 230 that the data stored in the HMB 231 is valid and has not been altered or corrupted (such as by a network attack). If the DMA 213 determines that the signature is different from the stored signature then the completion message includes an error notification. The error notification indicates to the host memory 242 of the host device 230 that the data stored in the HMB 231 is invalid and has been altered or corrupted (such as by a network attack).

Figure 4:
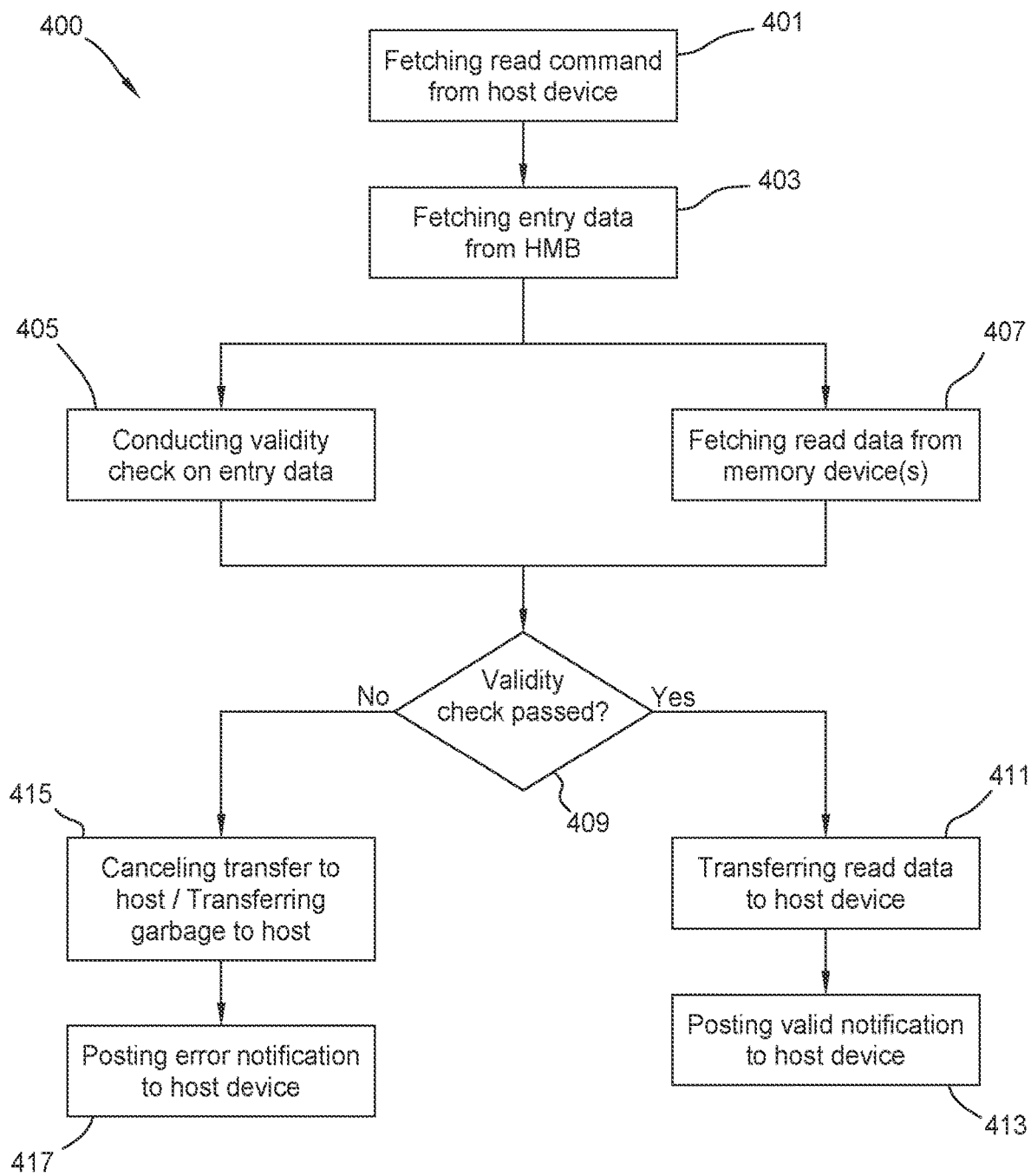
FIG. 4 is a schematic view of a method of operating a data system, according to one implementation.

FIG. 4 is a schematic view of a method 400 of operating a data system, according to one implementation. The method 400 includes operations, aspects, features, components, and/or properties of the operation flow shown in FIG. 3. The present disclosure contemplates that the operation flow includes operations, aspects, features, components, and/or properties of the method 400 shown in FIG. 4.

Operation 401 of the method 400 includes fetching a command, such as a random read command, from a host device. Operation 403 includes fetching entry data from a host memory buffer (HMB) of the host device. In one embodiment, which can be combined with other embodiments, the entry data includes logical to physical (L2P) address. Operation 405 includes conducting a validity check on the entry data fetched from the HMB. The conducting of the validity check includes comparing a signature of a top level hash of a plurality of hashes of a Merkle tree to a stored signature that was previously stored in relation to the Merkle tree. The conducting of the validity check also includes determining if the signature is the same as or different from the stored signature.

Simultaneously with the validity check conducted at operation 405, fetching read data from one or more memory devices (such as one or more NAND devices) occurs at operation 407. Operation 409 includes determining whether the validity check is passed. The validity check is passed if the signature of the top level hash is the same as the stored signature. The validity check is failed if the signature of the top level hash is different from the stored signature. If the validity check is passed, then the HMB is secure and has not been altered or corrupted (such as by a network attack). If the validity check is failed then the HMB is insecure and has been altered or corrupted (such as by a network attack).

If the validity check is passed, then the read data that is fetched from the one or more memory devices is transferred to a host memory of the host device at operation 411, and a completion message having a valid notification is posted to the host memory of the host device at operation 413.

If the validity check is failed, then the transferring of the read data to the host memory of the host device is cancelled at operation 415, and garbage data is transferred to the host memory of the host device at operation 415. If the validity check is failed, then operation 417 includes posting a completion message having an error notification to the host memory of the host device.

Figure 5:
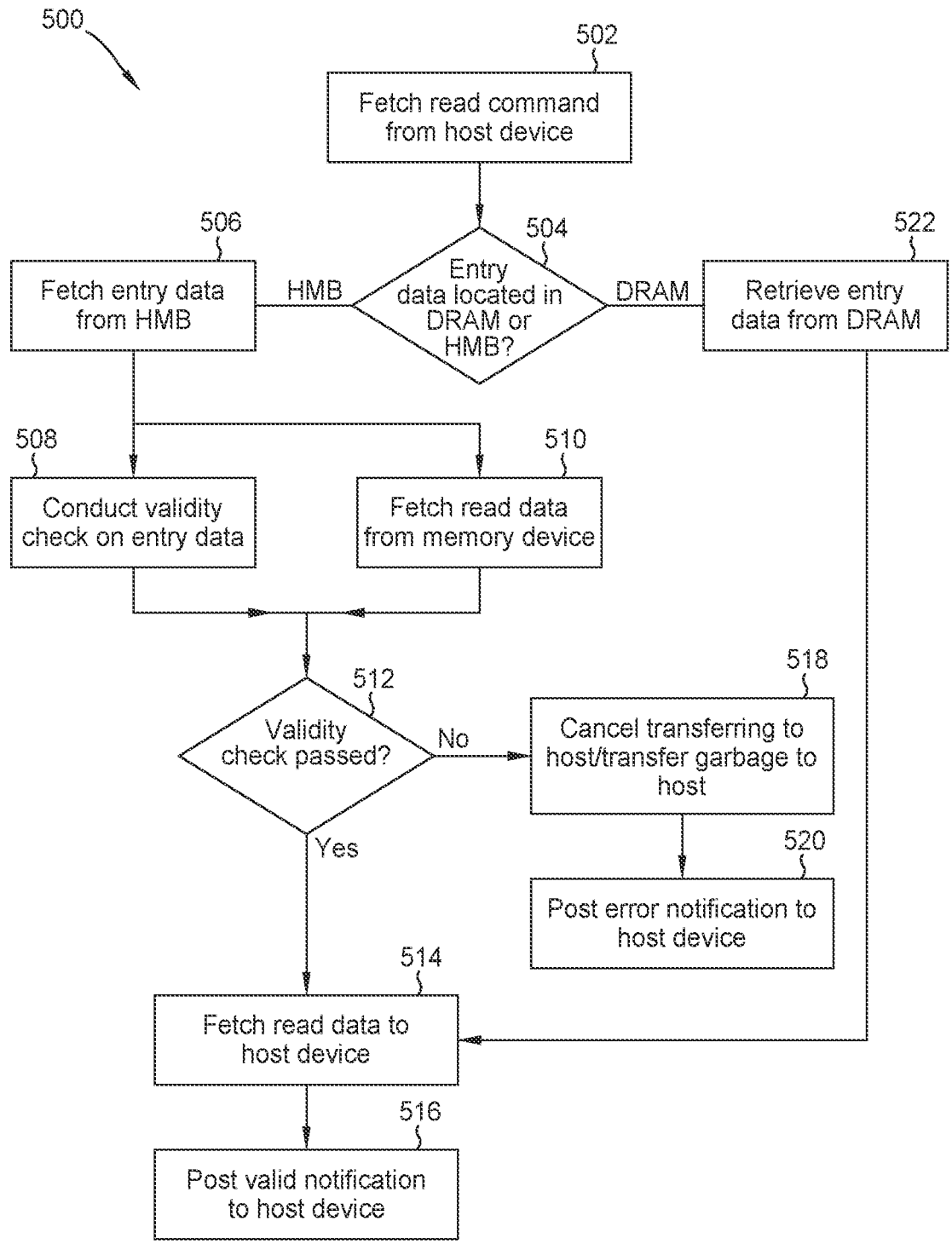
FIG. 5 is a schematic view of a method of operating a data system, according to one implementation.

FIG. 5 is a schematic view of a method 500 of operating a data system, according to one implementation. Operation 502 of the method 500 includes fetching a command, such as a random read command, from a host device. Once the command is fetched from the host device, a determination is made at 504 regarding whether the entry data is located in the HMB or in DRAM, where the DRAM is located in the data storage device controller. If the entry data is located in HMB, then operation 506 includes fetching the entry data from HMB. In one embodiment, which can be combined with other embodiments, the entry data includes logical to physical (L2P) address. Operation 508 includes conducting a validity check on the entry data fetched from the HMB. The conducting of the validity check includes comparing a signature of a top level hash of a plurality of hashes of a Merkle tree to a stored signature that was previously stored in relation to the Merkle tree. The conducting of the validity check also includes determining if the signature is the same as or different from the stored signature.

Simultaneously with the validity check conducted at operation 508, fetching read data from one or more memory devices (such as one or more NAND devices) occurs at operation 510. Operation 512 includes determining whether the validity check is passed. The validity check is passed if the signature of the top level hash is the same as the stored signature. The validity check is failed if the signature of the top level hash is different from the stored signature. If the validity check is passed, then the HMB is secure and has not been altered or corrupted (such as by a network attack). If the validity check is failed then the HMB is insecure and has been altered or corrupted (such as by a network attack).

If the validity check is passed, then the read data that is fetched from the one or more memory devices is transferred to a host memory of the host device at operation 514, and a completion message having a valid notification is posted to the host memory of the host device at operation 516.

If the validity check is failed, then the transferring of the read data to the host memory of the host device is cancelled at operation 518, and garbage data is transferred to the host memory of the host device at operation 518. If the validity check is failed, then operation 520 includes posting a completion message having an error notification to the host memory of the host device.

If the entry data is stored in DRAM as determined at 504, then the entry data is retrieved from DRAM at 522, the data is read and transferred to the host device at 514, and the valid notification is posted to the host device at 516. Because the entry data is stored in DRAM rather than HMB, the validity check utilized for HMB storage is not necessary. However, it is to be understood that even if the entry data is stored in DRAM, the same validity check can occur as occurs when the entry data is stored in HMB. In such a scenario, rather than proceeding to 514 after 522, the method 500 would proceed to 508 and 510 following 522. The method of FIG. 5 is representative of an embodiment where both HMB and DRAM are present while the method of FIG. 4 is representative of an embodiment where the data storage device is DRAM-less.

Benefits of the present disclosure include practically and simply securing HMBs of host devices while facilitating reduced latency, heightened performance, and operational efficiency. As an example, aspects described herein facilitate practically and simply implementing Merkle tree security on the HMB 231 with reduced latency. Using a Merkle tree to validate security of the HMB 231 otherwise may take 5 μSec (microseconds) or longer. However, using aspects described herein, using the Merkle tree 100 to validate the security of the HMB 231 is conducted simultaneously with the fetching of the read data from the one or more memory devices 220 (which can take 50 μSec (microseconds) or longer) to reduce latency and operational delays by 4-5 μSec (microseconds) or more.

It is contemplated that one or more aspects disclosed herein may be combined. Moreover, it is contemplated that one or more aspects disclosed herein may include some or all of the aforementioned benefits. As an example, operations, aspects, components, features, and/or properties of the data system 200 shown in FIG. 2A and the operation flow shown in FIG. 3 may be combined with the method 400 shown in FIG. 4.

In one embodiment, a data storage device comprises one or more memory devices, and a controller coupled to the one or more memory devices, wherein the controller is DRAM-less. The controller is configured to fetch a command from a host device, and the host device includes a host memory buffer (HMB). The controller is configured to fetch entry data from the HMB in response to the command from the host device. The controller is configured to fetch read data from the one or more memory devices using the entry data. The controller is configured to conduct a validity check of the entry data fetched from the HMB simultaneously with the fetching of the read data from the one or more memory devices, and transmit validity result data to the host device. The HMB includes a Merkle tree having a plurality of hashes. The validity check includes comparing a signature of a top level hash of the plurality of hashes to a stored signature that is stored within the controller, and determining if the signature is the same as or different from the stored signature. The validity result data transmitted to the host device includes the read data if the signature is the same as the stored signature. The validity result data transmitted to the host device includes garbage data if the signature is different from the stored signature. The controller is further configured to post a completion message to the host device. The completion message includes a valid notification if the signature is the same as the stored signature. The completion message includes an error notification if the signature is different from the stored signature. The fetching the read data from the one or more memory devices includes sending a sense request to the one or more memory devices prior to the determining if the signature is the same as or different from the stored signature. In one example, the one or more memory devices are one or more NAND devices.

In one embodiment, a data storage device comprises one or more memory devices, and a controller coupled to the one or more memory devices, wherein the controller is DRAM-less. The controller is configured to fetch a command from a host device. The host device includes a host memory buffer (HMB), and the HMB includes a Merkle tree having a plurality of hashes. The controller is configured to fetch entry data from the HMB in response to the command from the host device. The controller is configured to fetch read data from the one or more memory devices using the entry data. The controller is configured to conduct a validity check of the entry data fetched from the HMB simultaneously with the fetching of the read data from the one or more memory devices. The validity check includes comparing a signature of a top level hash of the plurality of hashes to a stored signature that is stored within the controller, and determining if the signature is the same as or different from the stored signature. The controller includes a control path including one or more processors, and the control path is configured to control the one or more memory devices. The controller includes a host interface module, and the host interface module is configured to communicate with the host device and the control path. The host interface module is configured to manage the HMB. The controller includes a direct memory access (DMA), and the DMA is configured to communicate with the host interface module and the control path. The controller includes an error correction code (ECC), and the ECC is configured to communicate with the DMA and configured to encode and decode data for error correction. The controller includes a flash interface module, and the flash interface module is configured to communicate with the one or more memory devices. The fetching the read data from the one or more memory devices includes the control path sending a sense request to the one or more memory devices. The host interface module executes the validity check. The DMA is configured to send instructions to the host interface module to transmit validity result data to the host device. The DMA is further configured to send instructions to the host interface module to post a completion message to the host device.

In one embodiment, a data storage device comprises memory means and a controller, wherein the controller is DRAM-less, and wherein the controller is configured to fetch a command from a host device, and the host device includes a host memory buffer (HMB); fetch entry data from the HMB in response to the command from the host device; fetch read data from one or more memory devices using the entry data; conduct a validity check of the entry data fetched from the HMB simultaneously with the fetching of the read data from the one or more memory devices; and transmit validity result data to the host device. Conducting the validity check of the entry data includes comparing a signature of a top level hash of a plurality of hashes stored in a Merkle tree of the HMB to a stored signature, and determining if the signature is the same as or different from the stored signature. The controller includes a host interface module coupled to a direct memory access (DMA). The DMA is coupled to an error correction module and a flash interface module (FIM). The conducting the validity check and fetching read data is performed simultaneously.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
one or more memory devices; and
a controller coupled to the one or more memory devices, wherein the controller is DRAM-less, and wherein the controller is configured to:
fetch a command from a host device, wherein the host device comprises a host memory buffer (HMB);
fetch entry data from the HMB in response to the command from the host device;
fetch read data from the one or more memory devices using the entry data and conduct a validity check of the entry data fetched from the HMB, wherein the fetching read data from the one or more memory devices and the conducting a validity check occurs simultaneously; and
transmit validity result data to the host device.

2. The data storage device of claim 1, wherein the one or more memory devices are one or more NAND devices.

3. A data storage device, comprising:
one or more memory devices; and
a controller coupled to the one or more memory devices, wherein the controller is DRAM-less, and wherein the controller is configured to:
fetch a command from a host device, wherein the host device comprises a host memory buffer (HMB);
fetch entry data from the HMB in response to the command from the host device;
fetch read data from the one or more memory devices using the entry data;
conduct a validity check of the entry data fetched from the HMB simultaneously with the fetching of the read data from the one or more memory devices; and
transmit validity result data to the host device, wherein the HMB comprises a Merkle tree having a plurality of hashes, and the validity check comprises:
comparing a signature of a top level hash of the plurality of hashes to a stored signature that is stored within the controller; and
determining if the signature is the same as or different from the stored signature.

4. The data storage device of claim 3, wherein the validity result data transmitted to the host device comprises the read data if the signature is the same as the stored signature.

5. The data storage device of claim 3, wherein the validity result data transmitted to the host device comprises garbage data if the signature is different from the stored signature.

6. The data storage device of claim 3, wherein the controller is further configured to post a completion message to the host device.

7. The data storage device of claim 6, wherein the completion message comprises a valid notification if the signature is the same as the stored signature.

8. The data storage device of claim 6, wherein the completion message comprises an error notification if the signature is different from the stored signature.

9. The data storage device of claim 3, wherein the fetching the read data from the one or more memory devices comprises sending a sense request to the one or more memory devices prior to the determining if the signature is the same as or different from the stored signature.

10. A data storage device, comprising:
one or more memory devices; and
a controller coupled to the one or more memory devices, wherein the controller is DRAM-less, and wherein the controller is configured to:
fetch a command from a host device, wherein the host device comprises a host memory buffer (HMB), and the HMB comprises a Merkle tree having a plurality of hashes;
fetch entry data from the HMB in response to the command from the host device;
fetch read data from the one or more memory devices using the entry data; and
conduct a validity check of the entry data fetched from the HMB simultaneously with the fetching of the read data from the one or more memory devices, the validity check comprising:
comparing a signature of a top level hash of the plurality of hashes to a stored signature that is stored within the controller, and
determining if the signature is the same as or different from the stored signature.

11. The data storage device of claim 10, wherein the controller comprises:
a control path comprising one or more processors, wherein the control path is configured to control the one or more memory devices;
a host interface module, wherein the host interface module is configured to communicate with the host device and the control path, and the host interface module is configured to manage the HMB;
a direct memory access (DMA), wherein the DMA is configured to communicate with the host interface module and the control path;
an error correction code (ECC), wherein the ECC is configured to communicate with the DMA and configured to encode and decode data for error correction; and
a flash interface module, wherein the flash interface module is configured to communicate with the one or more memory devices.

12. The data storage device of claim 11, wherein the fetching the read data from the one or more memory devices comprises the control path sending a sense request to the one or more memory devices.

13. The data storage device of claim 11, wherein the host interface module executes the validity check.

14. The data storage device of claim 11, wherein the DMA is configured to send instructions to the host interface module to transmit validity result data to the host device.

15. The data storage device of claim 14, wherein the DMA is further configured to send instructions to the host interface module to post a completion message to the host device.

16. A data storage device, comprising:
memory means; and a controller coupled to the memory means, wherein the controller is DRAM-less, and wherein the controller is configured to:
   fetch a command from a host device, wherein the host device comprises a host memory buffer (HMB);
   fetch entry data from the HMB in response to the command from the host device;
   fetch read data from one or more memory devices using the entry data and conduct a validity check of the entry data fetched from the HMB, wherein the fetching read data from the one or more memory devices and the conducting a validity check occurs simultaneously; and
   transmit validity result data to the host device.

17. The data storage device of claim 16, wherein the controller includes a host interface module coupled to a direct memory access (DMA).

18. The data storage device of claim 17, wherein the DMA is coupled to an error correction module and a flash interface module (FIM).

19. The data storage device of claim 17, wherein conducting the validity check and fetching read data is performed simultaneously.

20. A data storage device, comprising:
memory means; and
a controller coupled to the memory means, wherein the controller is DRAM-less, and wherein the controller is configured to:
   fetch a command from a host device, wherein the host device comprises a host memory buffer (HMB);
   fetch entry data from the HMB in response to the command from the host device;
   fetch read data from one or more memory devices using the entry data;
   conduct a validity check of the entry data fetched from the HMB simultaneously with the fetching of the read data from the one or more memory devices; and
   transmit validity result data to the host device, wherein conducting the validity check of the entry data comprises:
comparing a signature of a top level hash of a plurality of hashes stored in a Merkle tree of the HMB to a stored signature; and
determining if the signature is the same as or different from the stored signature.

\* \* \* \* \*